(12) United States Patent
Philipp et al.

(10) Patent No.: US 6,734,392 B2
(45) Date of Patent: May 11, 2004

(54) METHOD AND APPARATUS FOR LASER MARKING A MOVING OBJECT

(75) Inventors: Wilfried Philipp, Kornwestheim (DE); Andreas Grabotin, Heimsheim (DE)

(73) Assignee: Tampoprint AG, Korntal-Muenchingen (DE)

( * ) Notice: Subject to any disclaimer, the term of this patent is extended or adjusted under 35 U.S.C. 154(b) by 0 days.

(21) Appl. No.: 10/097,267

(22) Filed: Mar. 15, 2002

(65) Prior Publication Data

US 2003/0052100 A1 Mar. 20, 2003

(30) Foreign Application Priority Data

Sep. 19, 2001 (DE) .......................................... 101 46 820

(51) Int. Cl.[7] .............................................. B23K 26/00
(52) U.S. Cl. ............................ 219/121.82; 219/121.68; 219/121.69
(58) Field of Search ....................... 219/121.68, 121.69, 219/121.82; 347/224

(56) References Cited

U.S. PATENT DOCUMENTS

| | | | | |
|---|---|---|---|---|
| 4,259,901 A | * | 4/1981 | Kidd | |
| 4,285,186 A | * | 8/1981 | Desom | |
| 4,675,498 A | * | 6/1987 | Lemelson | |
| 4,965,829 A | * | 10/1990 | Lemelson | 219/121.69 |
| 5,098,005 A | * | 3/1992 | Jack | |
| 5,653,900 A | * | 8/1997 | Clement et al. | 219/121.68 |
| 5,734,412 A | * | 3/1998 | Hasebe et al. | |
| 5,824,715 A | * | 10/1998 | Hayashihara et al. | |

* cited by examiner

Primary Examiner—Geoffrey S Evans
(74) Attorney, Agent, or Firm—Paul Vincent

(57) ABSTRACT

A method and apparatus for laser making a moving object may be used to decorate the surfaces of sealing caps. The sealing caps are transported past a first and second sensor for detecting the transport speed and the position of the sealing cap to be decorated to a laser station having at least one laser for decorating the sealing cap using the laser beam. The first and second sensors communicate with a laser beam control device and the information of the sensors is linked with the control information for the laser beam.

11 Claims, 2 Drawing Sheets

METHOD AND APPARATUS FOR LASER MARKING A MOVING OBJECT

This application claims Paris Convention priority of DE 101 46 820.2 filed Sep. 19, 2001 the complete disclosure of which is hereby incorporated by reference.

BACKGROUND OF THE INVENTION

The invention concerns a device for decorating sealing cap surfaces, in particular, the sealing caps of beverage bottles, comprising a transport means for the sealing caps, a sensor for detecting the position of the sealing cap to be treated, and a laser station comprising a laser for processing the sealing cap by means of the laser beam.

Lasers have been conventionally used to mark sealing caps, i.e. by irradiating a high-energy laser beam through a mask onto the sealing cap for an extremely short period of time. The mask defines the information to be marked. The laser beam does not produce information or an image but merely illuminates the mask. The mask can be compared with a diapositive containing information which is irradiated by a radiation source onto the object to be treated and is burned into the surface by the high-energy laser beam.

Since the high-energy laser beam is required for only a very short time, the objects to be treated can be marked during transport if their transport speed is low. Although the information applied through the mask is not of high quality with regard to sharpness and accuracy, it is nevertheless possible to apply the production date, production location, production information etc. to the moving object.

In contrast to this marking process, decoration of objects without using a mask is also known, with the decoration being produced through deflection of the laser beam. The laser beam therefore forms the image. Advantageously, the quality of the decoration is considerably improved with regard to sharpness and fineness compared to the above-mentioned marking procedure. Moreover, different (personalized) information can be provided, since the information content is not defined and limited by a rigid mask. Disadvantageously, however, the construction of an image for decorating objects takes a relatively long time and can therefore not be effected during transport of the sealing caps. Transport must therefore be interrupted.

It is therefore the underlying purpose of the present invention to provide a device for decorating surfaces of sealing caps and/or a method for decorating surfaces of sealing caps with which the time period between entry of the sealing cap into and exit of the sealing cap out of the decorating device is shortened.

SUMMARY OF THE INVENTION

This object is achieved in accordance with the invention with a decorating device for the surfaces of sealing caps in that the decorating device has a transport means for the sealing caps, a first sensor for detecting the transport speed of the sealing caps, a second sensor for detecting the position of the sealing cap to be decorated, and a laser station with at least one laser for decorating the sealing cap by means of the laser beam, wherein the control means of the laser beam is connected to the first and second sensor, and the information of the sensors is linked with the control information for the laser beam.

In the inventive decorating device, the transport of the sealing caps to be decorated is not interrupted. The sealing caps are decorated in the laser station during transport. A first sensor detects the transport speed of the sealing cap to be decorated, and a second sensor determines the position of the sealing cap to be decorated, wherein the data of these two sensors is linked with the information for controlling the laser beam such that the laser beam is transported at the same speed to prevent a relative speed shift between the object to be decorated and the image to be produced. The movement coordinates of the sealing cap to be decorated overlie the control coordinates of the laser beam.

The inventive decorating device is advantageous in that the sealing caps to be decorated remain in the laser station for a considerably shorter time, permitting easy integration of the decorating device in a system for producing such sealing caps or in a filling system. The production flow is not impaired or slowed down by the decorating device.

In accordance with the invention, the laser is stationary. This produces a considerably sharper contour, since the laser is mounted in a shock-free manner, together with the deflecting mirrors and the focusing objective.

Preferably, the laser is a solid state laser, e.g. a YAG laser, a gas laser, e.g. a $CO_2$ or HeNe laser, a liquid laser or a semiconductor laser. The use of the appropriate laser produces optimum decoration results for the sealing cap. Selection of the laser can also be matched to the sealing cap material or to the design to be provided.

In a preferred embodiment, the transport means has switches, disposed upstream of the laser station, for multi-path transport of the sealing caps through the laser station. This multi-path transport has the considerable advantage that the transport speed of the sealing caps is reduced to increase the quality of the decoration and to increase the total throughput of sealing caps. This permits adaptation of the laser station to almost any transport speed.

In case of sealing cap transport along several paths, each transport path is associated with one laser. In addition to an increase in performance of the laser station, this is further advantageous since the sealing caps can be provided with different decorations without having to change the laser control data.

In a further development, the decorating device has its own transport means for the sealing caps and, in particular, all sealing caps are transported through the decorating device uniformly and at the same speed.

The above-mentioned object is also achieved in accordance with the invention with a method for decorating the surfaces of sealing caps, in particular of the sealing caps of beverage bottles, wherein the sealing caps are transported by a transport means, the speed and the position of the sealing cap to be decorated are detected and the sealing cap is decorated in a laser station during transport and by means of a laser.

This inventive method has the above-mentioned advantages, i.e. that the production process of the sealing caps is not disturbed and that the inventive method can be directly integrated in the production device or in a filling station. Precise decoration can be applied to the sealing caps at a high speed.

The inventive method produces decoration by means of a laser beam moving over the surface to be decorated. In contrast to marking of a surface using a high-energy laser beam directed through a mask, onto the surface to be decorated, decoration with the inventive method is carried out via the laser beam without using a mask: the laser beam is moved over the surface to be decorated.

In the inventive method, the information corresponding to the transport speed overlies the information of the control means for the laser beam. The information concerning the transport speed as well as the information concerning the position of the sealing cap is determined by sensors.

Further advantages, features and details can be extracted from the following detailed description of two particularly preferred embodiments with reference to the drawing. The features shown in the drawing, in the description, and in the claims may be essential to the invention either individually or collectively in any arbitrary combination.

DESCRIPTION OF THE PREFERRED EMBODIMENT

Figure 1:
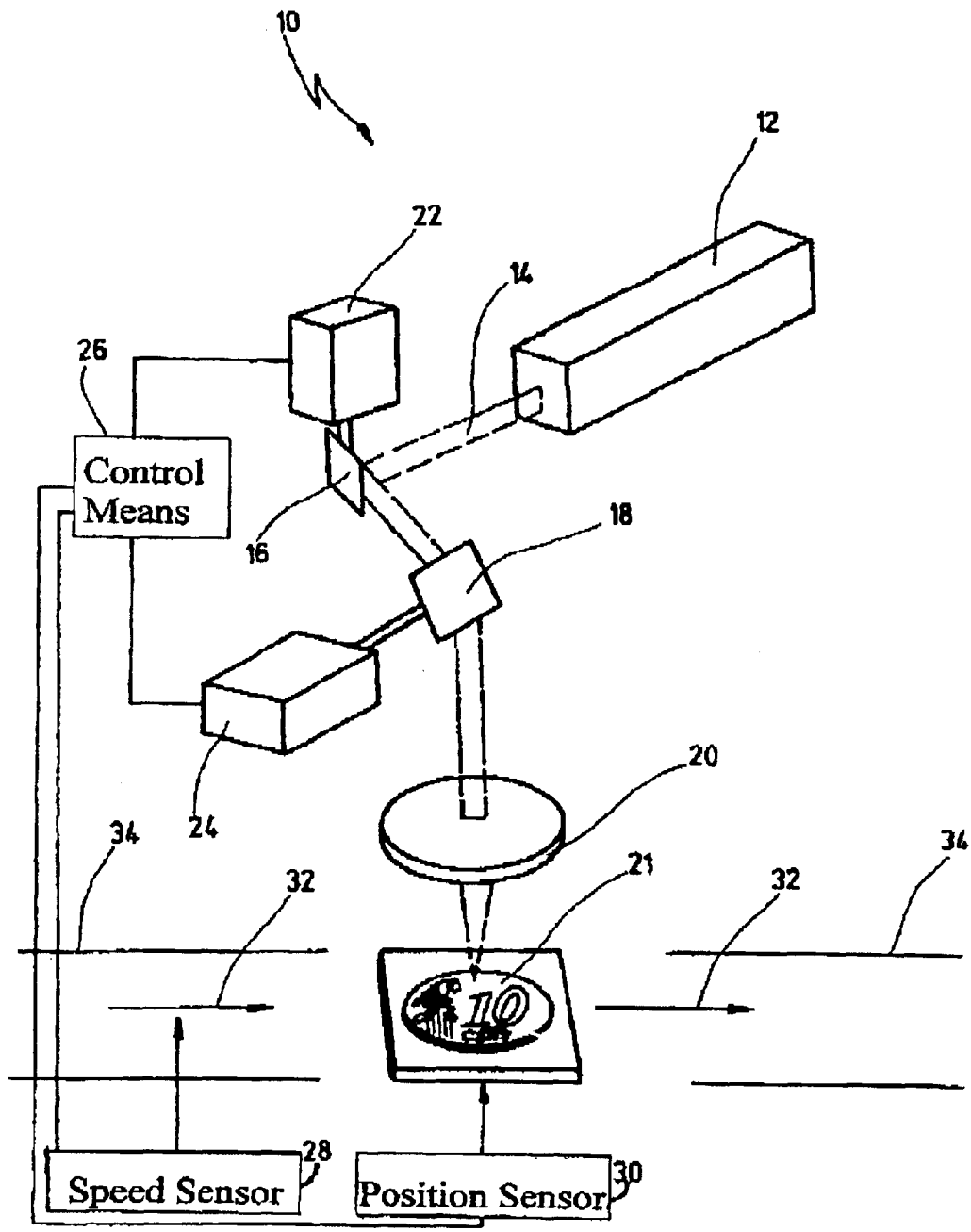
FIG. 1 shows a perspective view of a laser station.

FIG. 1 shows a laser station (referred to in its totality with 10) including a laser 12. This laser 12 emits a laser beam 14 which impinges on a first scanner or deflecting mirror 16 from which it is deflected towards the second scanner or deflecting mirror 18. The second deflecting mirror 18 deflects the laser beam 14 towards a focusing objective 20 which, in turn, precisely directs the laser beam 14 onto the surface of a sealing cap 21. The two deflecting mirrors 16 and 18 are moved and adjusted by suitable drives 22 and 24. The drives 22 and 24 obtain the control data from a control means 26 which, in turn, is connected to a first sensor 28 and a second sensor 30. The first sensor 28 detects the transport speed of the sealing cap 21, whereas the second sensor 30 detects the position of the sealing cap 21 to be decorated. The arrows 32 illustrate the transport direction. The reference arrow 34 indicates a transport means which can be formed by a tape, a chain, a toothed belt or the like and is part of the decorating device.

Figure 2:
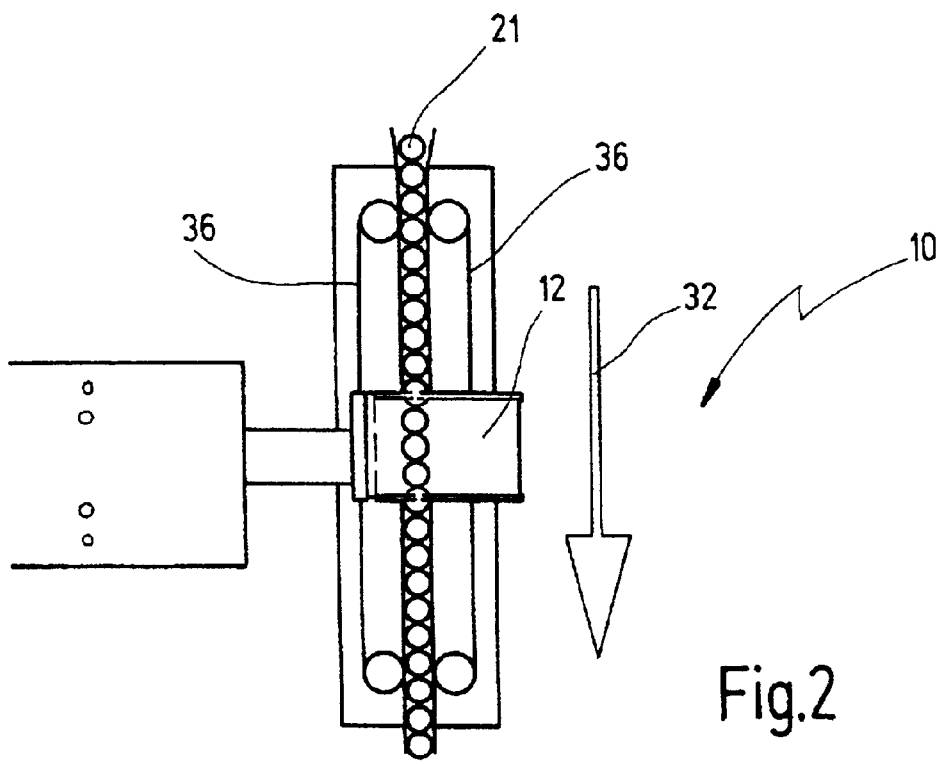
FIG. 2 shows a top view onto the laser station of FIG. 1.

FIG. 2 shows a top view onto the laser station 10 illustrating clearly that, from entering the laser station 10 to exiting therefrom, the sealing caps 21 are uniformly transported and held, without slippage, between two circulating transport belts 36 for decoration by the laser beam 14 of the laser 12.

Figure 3:
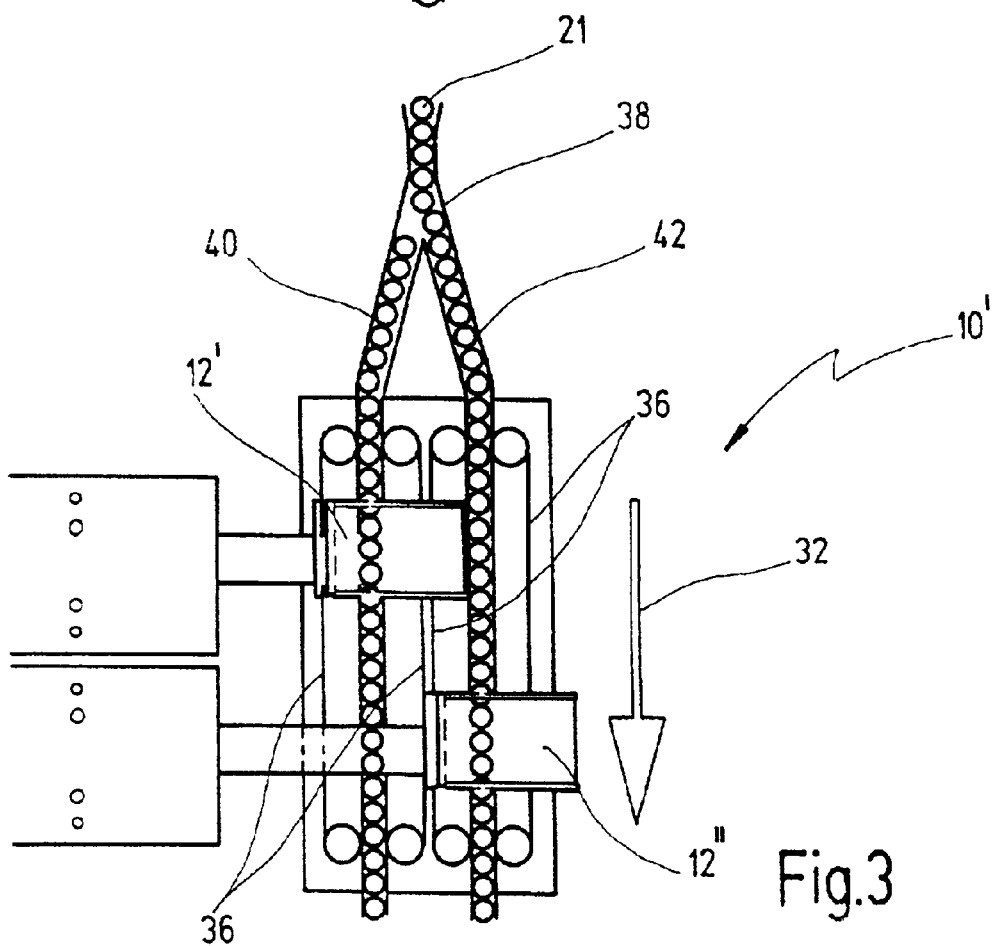
FIG. 3 shows a top view onto an alternative embodiment of a laser station.

In the embodiment of FIG. 3, switches 38 are provided upstream of the laser station 10' which divide the single transport path into two tracks 40 and 42, thereby reducing the transport speed of the sealing caps 21 within the laser station 10' to 50%. The sealing caps 21 of the one track are decorated by the laser beam of a first laser 12' and the sealing caps 21 of the second track 42 are decorated by the laser beam of a second laser 12". Also in this variant, the sealing caps 21 are guided and held, without slippage, in the laser station 10' by transport belts 36.

We claim:

1. A method for decorating the surfaces of sealing caps and beverage bottle sealing caps, the method comprising the steps of:

a) transporting the sealing caps using a transport means;

b) determining a transport speed of the sealing caps using a speed sensor;

c) determining a transport position of the sealing caps using a position sensor; and d) decorating, during step a), the sealing caps using a laser disposed within a laser station, wherein said transport speed is determined in step b) without assistance of said position sensor and said transport position is determined in step c) without assistance of said speed sensor.

2. The method of claim 1, wherein step d) comprises moving a laser beam over a surface to be decorated.

3. The method of claim 2, wherein information corresponding to said transport speed overlies information of a control means for moving said laser beam.

4. The method of claim 1, wherein the sealing caps are provided with at least one of alternating, different, and personalized decoration.

5. A device for decorating the surfaces of sealing caps and beverage bottle sealing caps, the device comprising:

means for transporting the sealing caps;

means for determining a transport speed of the sealing cans using a speed sensor;

means for determining a transport position of the sealing caps using a position sensor; and means for decorating the sealing caps during transport thereof using a laser disposed within a laser station, wherein said transport speed is determined without assistance of said position sensor and said transport position is determined without assistance of said speed sensor.

6. The decorating device of claim 5, wherein said decorating means comprises at least one laser for decorating the sealing caps using a laser beam and control means for said laser beam, said control means communicating with said speed sensor and said position sensors for linking information from said speed and said position sensors with control information for said laser beam.

7. The decorating device of claim 6, wherein said laser is stationary.

8. The decorating device of claim 6, wherein said laser is one of a solid state laser, a YAG laser, a gas laser, a $CO_2$ laser, a HeNe laser, a liquid laser, and a semiconductor laser.

9. The decorating device of claim 6, wherein said transport means comprise switches disposed upstream of said laser station for multi-path transport of the sealing caps through said laser station.

10. The decorating device of claim 9, wherein each transport path has an associated laser.

11. The decorating device of claim 6, wherein said transport means is part of the decorating device and further comprising means for coupling said transport means to at least one of additional upstream and additional downstream devices.

* * * * *

UNITED STATES PATENT AND TRADEMARK OFFICE
CERTIFICATE OF CORRECTION

PATENT NO. : 6,734,392 B2
DATED : May 11, 2004
INVENTOR(S) : Philipp et al.

It is certified that error appears in the above-identified patent and that said Letters Patent is hereby corrected as shown below:

<u>Column 4,</u>
Line 25, delete "cans" and insert -- caps --

Signed and Sealed this

Seventeenth Day of May, 2005

JON W. DUDAS
*Director of the United States Patent and Trademark Office*